W. P. MILLER.
Machines for Grinding Hay.
No. 139,911. Patented June 17, 1873.
Fig. 1.
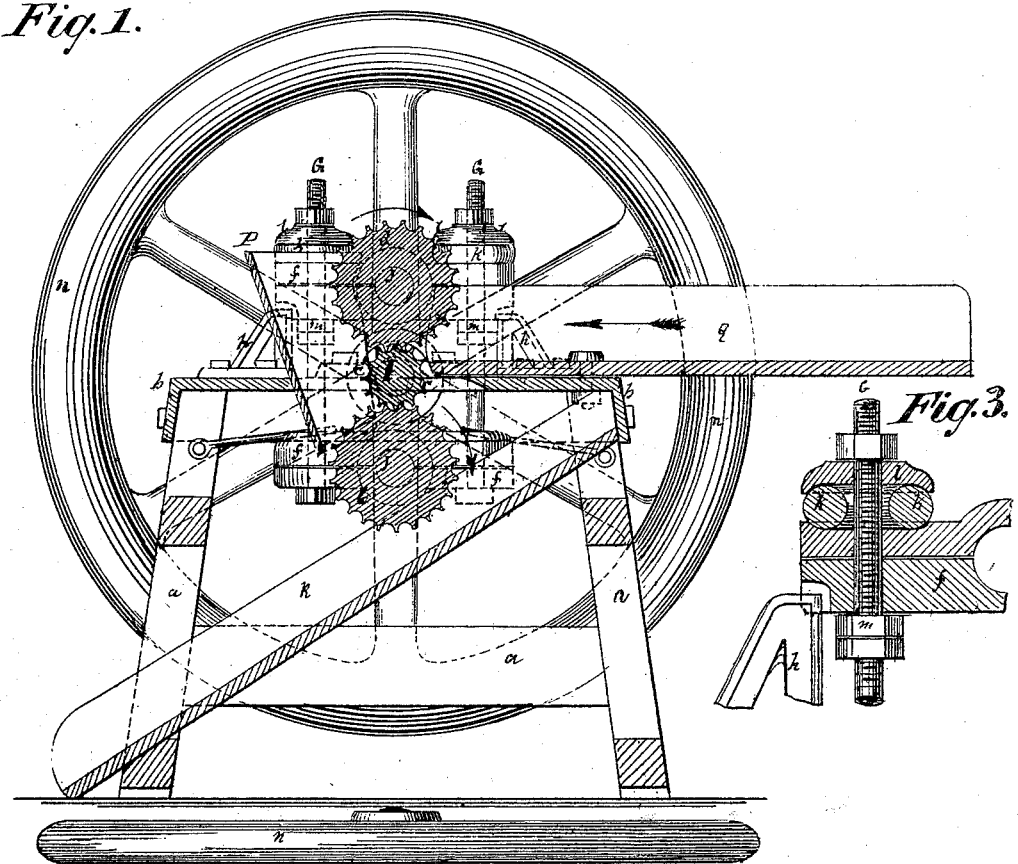
Fig. 3.
Fig. 2.
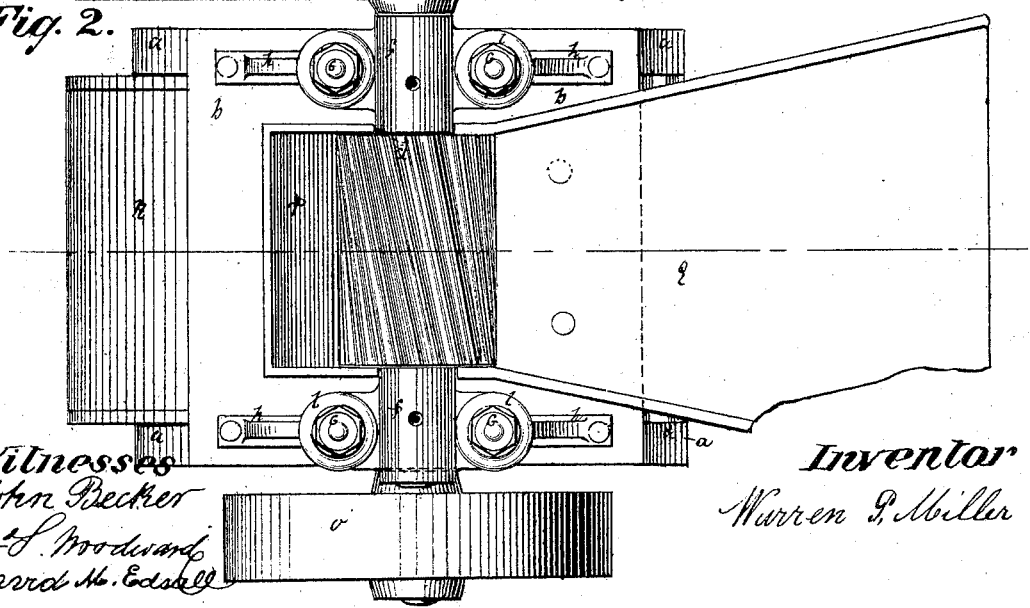
Witnesses
John Becker
Jn.º S. Woodward
David M. Edsall
Inventor
Warren P. Miller

UNITED STATES PATENT OFFICE.

WARREN P. MILLER, OF NEW YORK, N. Y.

IMPROVEMENT IN MACHINES FOR GRINDING HAY.

Specification forming part of Letters Patent No. 139,911, dated June 17, 1873; application filed April 29, 1873.

*To all whom it may concern:*

Be it known that I, WARREN P. MILLER, of the city, county, and State of New York, have invented a new and useful Machine for Grinding Hay and other like substances for food for animals; and do hereby declare that the following is a full, clear, and exact description of the construction and operation of the same, reference being had to the annexed drawing, making a part of this specification, in which—

Figure 1 is a vertical section; Fig. 2, a longitudinal section; Fig. 3, a section showing one of the clamping-bolts and box, also rubber spring, cap over same, and brace $h$, for the lateral support of the boxes.

$a$ is the frame or support of the machine; $b$, the iron table on top of frame; $c$, the lower cylinder or roller; $d$, the top cylinder or roller; C, the center roller; $f$, boxes for the shafts of the roller; G, bolts to support the boxes $f$; $h$, the braces; $i$, the shaft of center roller; $j$, the shafts of top and bottom rollers; $k$, the rubber springs; $l$, the iron cap over springs; $m$, the check-nuts; $n$, the fly-wheel; $o$, the driving-pulley; P, the hopper; Q, the feeding-table; R, the apron.

The nature and object of my invention are to provide a cheap and effective machine for grinding or mashing hay and stalks for food for animals, thereby lessening the labor of masticating, and facilitating its digestion.

To enable others skilled in the art to make and use my invention, I will proceed to describe its construction and operation.

I construct the iron table $b$ in form as shown, with boxes for the support of the center driving-shaft $i$ and braces $h\ h$, which are also bolted to the table. The rollers are made of iron of any desired size, and fluted spirally, in manner as shown, so that they will work one into the other like cogs. The top roller rests upon the center one, and the bolts G G G G support the boxes that carry the lower roller, and by turning the nuts on said bolts the rollers may be adjusted as desired. The springs $k\ k$ are employed so as to allow the rollers to separate and pass any substance that cannot be crushed. The fly-wheel $n$ and pulley $o$ are secured to the shaft of the center roller.

It will be readily seen that power may be applied to the pulley and the rollers driven in the direction indicated by the arrows. The hay is then fed to the rollers from the apron R, passes over the center one, the hopper P P stops it, and causes it to pass between the center and lower roller, after which it falls into the apron R.

What I claim as my invention, and desire to secure by Letters Patent, is—

The grooved rollers $c$, $d$, and C working together in the manner described, in combination with the boxes $f$, screw-bolts G, spring-collars $k$, and hoppers P and Q, all substantially as and for the purpose set forth.

WARREN P. MILLER.

Witnesses:
JNO. S. WOODWARD,
DAVID M. EDSALL.